United States Patent [19]
Evans

[11] 3,980,041
[45] Sept. 14, 1976

[54] SPEEDOMETER WITH SPEED WARNING INDICATOR AND METHOD OF PROVIDING THE SAME

[76] Inventor: Robert Burns Evans, 1151 223rd St., Carson, Calif. 90745

[22] Filed: Oct. 22, 1974

[21] Appl. No.: 517,278

[52] U.S. Cl. .............................. 116/116; 116/129 E
[51] Int. Cl.² ........................................ G01P 1/10
[58] Field of Search ............ 116/116, 57, 56, 129 F, 116/129 E, 129 K; 156/99, 100, 106, 107, 108; 73/181, 182, 488

[56] References Cited
UNITED STATES PATENTS

| | | | |
|---|---|---|---|
| 2,158,925 | 5/1939 | Braswell | 116/129 E |
| 2,357,345 | 9/1944 | Moulton | 156/106 |
| 2,533,474 | 12/1950 | Koch | 156/108 |
| 3,276,418 | 10/1966 | Harris | 116/116 |

OTHER PUBLICATIONS
Tricolor Speedometer; Sunday Morning Star; Peoria, Illinois Jan. 26, 1936.

Primary Examiner—S. Clement Swisher
Assistant Examiner—Denis E. Corr
Attorney, Agent, or Firm—Henry M. Bissell

[57] ABSTRACT

An improved speed warning indicator for a speedometer comprises a transparent plate such as a transparent decal, having means such as an attached transparent plastic sheet bearing adhesive for attaching it to the transparent face cover of a speedometer casing containing a speedometer dial. The plate bears indicia, such as color and/or a plurality of spaced lines, etc. demarking the plate and the speedometer dial viewed through the plate, thereby indicating a speed warning on the dial while still permitting unobstructed viewing of all of the dial. Preferably, the plate is configured and dimensioned to overlie only a portion of the cover and dial so as to more clearly provide the speed warning. The plate can be affixed, in accordance with the present method, to the face cover of a fully assembled speedometer so as to provide very easily, simply and effectively, the improved speedometer of the invention.

6 Claims, 6 Drawing Figures

SPEEDOMETER WITH SPEED WARNING INDICATOR AND METHOD OF PROVIDING THE SAME

BACKGROUND OF THE INVENTION

1. Field of the Invention

The present invention generally relates to speed indicators and more particularly to speedometers bearing speed warning indicators.

2. Description of the Prior Art

Speedometers are, of course, standard equipment on automobiles, trucks, motorcycles, buses and most bicycles, as well as other vehicles. Conventional speedometers usually indicate the speed of the vehicle by the position of a needle on the dial of the speedometer. In many instances, the dial is lighted for better viewing, particularly at night. However, since the speedometer dial is positioned on the vehicle's instrument panel well below the direct line of sight needed by the driver when steering the vehicle, most drivers usually can spare only an occasional quick glance at the dial when maneuvering the vehicle. Such a glance is ordinarily given while the driver's main attention is elsewhere. Accordingly, although the speed at which the vehicle is traveling is ostensibly periodically monitored by the driver through his occasional glances at the dial, such glances usually leave little impression on the driver. Instead the driver usually depends on the flow of traffic, road feel and other factors to guess the vehicle's speed. Such a practice can easily lead to habitually dangerously high vehicle speeds and increased risk of accidents, speeding citations and financial loss. The described risks are greater when the usual highway or freeway speed limits are suddenly changed as occurred in the latest fuel crisis. In that instance, a national speed limit of 55 miles per hour was instituted. Most states were forced to reduce their maximum speed limits, for example from 65 to 70 miles per hour to the 55 mile per hour limit, and the drivers of the nation's vehicles have had to learn to slow down. Many have not learned as yet and as a consequence the number of speeding citations has greatly increased recently.

Conventional speedometers do not provide speed warning means to aid the driver in such circumstances as described above. A few specialized devices have been employed in conjunction with speedometers to give speed warnings. However, such devices are expensive and invariably require dissembly of the speedometer or the construction of a speedometer of special design and its substitution for the one with which the vehicle is equipped. Few of such devices have ever been used and none have been used extensively and successfully.

Accordingly, it would be highly desirable to provide a simple inexpensive speed warning device for vehicles, which device could be connected to the standard installed vehicle speedometer without any dissembly of the speedometer and without the need of special brackets, fittings or skilled labor. Such device should provide a clear warning against excessive speed, should be easily viewable and should not obstruct the view of the speedometer.

SUMMARY OF THE INVENTION

The foregoing needs have been satisfied by the improved speed warning indicator of the present invention. The indicator is substantially as set forth in the Abstract above. Thus, it comprises a transparent plate dimensioned and configured to attach to the transparent front cover of the vehicle speedometer. The plate bears warning indicia, for example, a special color and/or a plurality of marks, spaces, ridges, etc. so that when the speedometer dial is viewed through it, a portion of the dial representing speeds in excess of a predetermined limit are demarked by the warning indicia. The driver only need glance at the dial while driving, with the indicator in place on the dial, and tell whether the speed limit is being exceeded or not, i.e. whether the speedometer needle is in or out of the warning area of the dial, as defined by the indicator plate. Sharp, accurate and swift reference to the dial can thus be made, with a lasting visual impression on the driver.

The indicator is easy to install on the speedometer cover, can be made inexpensively and is durable and effective. Moreover, it can be made adjustable for changes in the speed limits, etc. When installed, as by the present method of the invention, the indicator forms with the vehicle speedometer an improved speedometer of the invention. Further details of the invention are set forth in the following detailed description and accompanying drawings.

BRIEF DESCRPTION OF THE DRAWINGS

DESCRIPTION OF THE PREFERRED EMBODIMENTS

Figure 1:
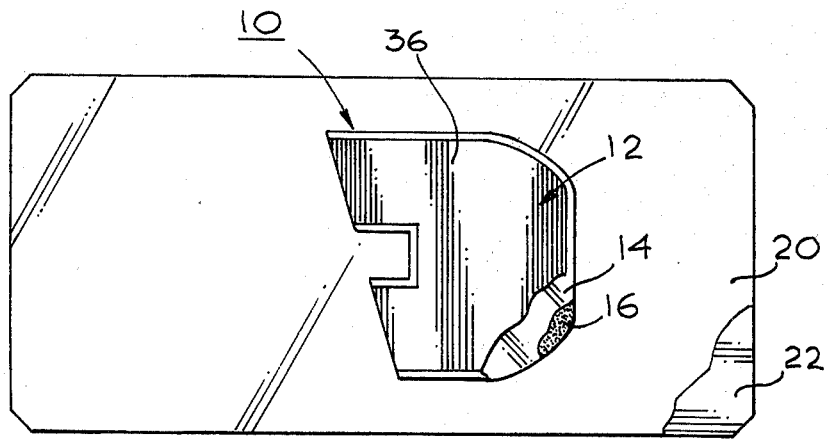
FIG. 1 is a schematic top plan view of a first preferred embodiment of the improved speed warning indicator of the present invention on a display card, portions being broken away to illustrate certain features thereof.
Figure 2:
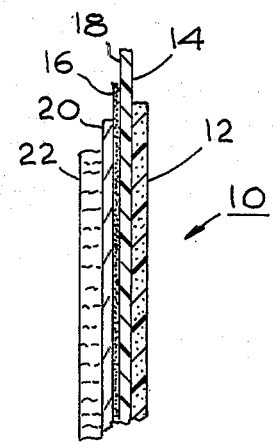
FIG. 2 is a schematic fragmentary greatly enlarged cross-section of a portion of the assembly of FIG. 1.

FIGS. 1 and 2

Now referring more particularly to FIGS. 1 and 2 of the accompanying drawings, a first preferred embodiment of the speed warning indicator of the invention is illustrated. Thus, indicator 10 is schematically depicted in plan view. Indicator 10 comprises a transparent decalcomania (hereinafter decal), that is, a thin flexible plastic plate 12 bonded to a thin flexible transparent backing sheet 14 bearing attaching means in the form of a layer 16 of contact adhesive on the side 18 thereof opposite that side to which plate 12 is attached. Layer 16 is in turn releasably affixed to a sheet 20 of waxed paper attached to and peelable from a pasteboard display card 22.

It will be understood that plate 12 can, if desired, be relatively flexible or stiff clear plastic, such as cellophane, celluloid, polyethylene, clear polyacrylate, polyvinylchloride, polysiloxane or another material, such as glass, etc. The attaching means, such as layer 16, can be of protein adhesive, such as casein glue, or rubber cement or any other suitable means which does not obscure the transparency of plate 12 or its equivalent. Backing sheet 14 need not be present, and usually is not present if plate 12 is self-supporting. Waxed paper sheet 20 and display pasteboard 22 are also optional. Suitable equivalents can be substituted, if desired.

FIG. 2 is only schematic. The true relative thicknesses of plate 12, sheets 14 and 20, layer 16 and pasteboard 22 are not represented therein.

Figure 3:
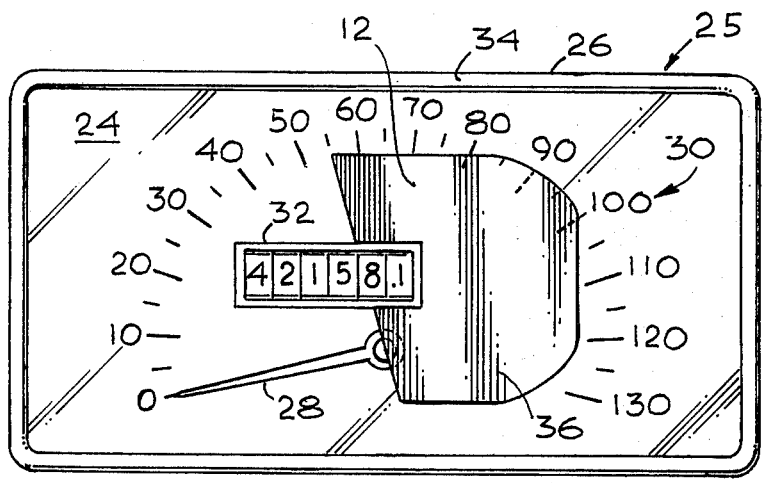
FIG. 3 is a schematic front elevation of the speed warning indicator of FIG. 1 in place on the front cover of a first vehicle speedometer.
Figure 4:
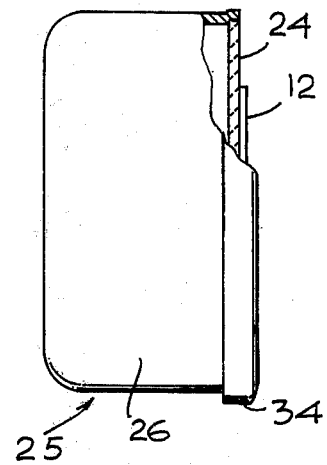
FIG. 4 is a schematic side elevation of the speedometer of FIG. 3, portions being broken away to illustrate certain features thereof.

FIGS. 3 and 4

The present method comprises affixing the indicator of the invention to the face (front cover) of a speedometer so as to provide an improved speedometer having a speed warning system. The present method can be used to produce the improved speedometer shown in FIGS. 3 and 4.

It will be noted that plate 12 is of a configuration and dimension such that when it is properly attached as by layer 16 and in accordance with the present method to the transparent front (face) glass cover 24 of a speedometer 25 having a casing 26 containing a speedometer needle 28 and dial 30, as well as a mileage indicator 32 (FIG. 3), it overlies only a portion of dial 30. Cover 24 is retained in place by a frame 34, as shown in FIG. 4. Plate 12 bears indicia 36 (FIG. 1) in the form of a color which demarks the boundaries of plate 12 and the portion of dial 30 overlaid by plate 12. In other words, the indicial color (red) of plate 12 appears to be on a portion of dial 30 when viewed through cover 24.

Plate 12 is positioned on dial 30 so that only the portion of the dial which contains numbers representing speeds in excess of the speed limit to be warned against is overlaid by plate 12, for example, speeds in excess of 55 mph, as shown in FIG. 3. Mileage indicator 32 is not covered. It will be understood that plate 12 can, if desired, be removed from cover 24 and either another similar plate of different configuration can be substituted or plate 12 can be recut and repositioned or merely repositioned on cover 24 so as to extend over another range of speed numbers on dial 30. For example this would be desirable in the event that the 55 mph current speed limit were abolished.

Accordingly the improved warning speed indicator of the invention is simple, inexpensive, easily installed and removed and easily redimensioned for reinstallation, if desired. When installed on cover 24, it forms with speedometer 25 a new and improved speedometer. Indicator 10 permits the driver of the vehicle containing it to instantly determine if the speed limit is or is not being exceeded. The color and position of plate 12 makes this possible. Accordingly, indicator 10 is a safety device of considerable utility.

Figure 5:
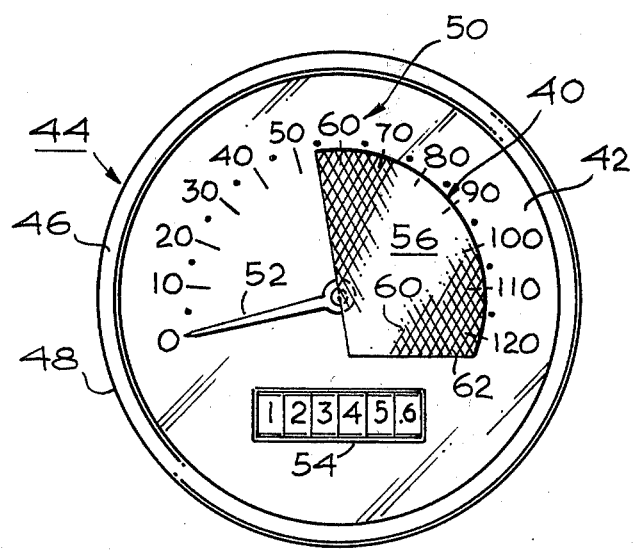
FIG. 5 is a schematic front elevation of a second preferred embodiment of the speed warning indicator of the invention in place on the front cover of a second vehicle speedometer.
Figure 6:
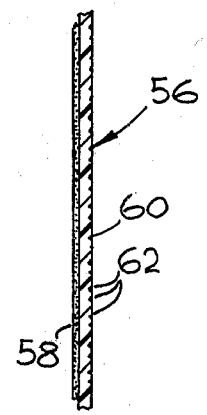
FIG. 6 is an enlarged schematic fragmentary crossssection of the indicator of FIG. 5.

FIGS. 5 and 6

A second preferred embodiment of the speed warning indicator of the invention is schematically depicted in front elevation in FIG. 5 and in enlarged fragmentary cross-section in FIG. 6. Thus, indicator 40 is shown in place on a transparent, round front glass cover 42 of a speedometer 44, cover 42 being held in a round frame 46 of a casing 48 within which a speedometer dial 50, pointer needle 52 and mileage indicator 54 are disposed.

Indicator 40 comprises a clear, colorless, plate 56 of self-supporting transparent glass or plastic, such as, polysiloxane, polyvinylchloride, celluloid or the like, to one side of which is affixed a clear layer 58 of adhesive, such as rubber cement, etc., which forms the means of securing plate 56 to cover 42. The shape and size of plate 56 are such that the plate overlies the portion of dial 50 which is adjacent to those speed numbers and marks on dial 50 which indicate speeds in excess of 55 mph.

Although plate 56 is clear and colorless, it contains indicia 60 in the form of finely etched cross-hatching 62 which renders plate 56 readily visible while still not obscuring dial 50. Accordingly, the portion of dial 50 overlaid by plate 56 is instantaneously recognizable by the vehicle driver. So also is the position of needle 52 relative to that excessive speed area. Accordingly, indicia 60 provide the necessary speed warning in the same general manner as does indicia 36 of plate 12. It will be understood that, if desired, plate 56 can be stippled or a plurality of spaced dots, imprinted lines or the like can be used as indicia in place of cross-hatching 62. Plate 56 is inexpensive and easy to install, remove, modify, reshape and reinstall.

Accordingly, an improved speed warning indicator is provided which, when installed on the transparent front cover of a conventional speedometer, as per the present method, converts it to the improved speedometer of the invention. The indicator is inexpensive, simple, safe, easy and fast to install and to use and has other advantages as set forth in the foregoing.

Various changes, modifications, alterations and additions can be made in the present method, its steps and parameters, in the present indicator and its components, and in the improved speedometer incorporating the same. All such changes, modifications, alterations and additions as are within the scope of the appended claims form part of the present invention.

What is claimed is:

1. An improved speed warning indicator for a speedometer, said warning indicator comprising:
   a transparent plate of clear plastic having means for attaching said plate to the transparent front cover of a speedometer casing having a speedometer dial disposed therein and spaced behind said cover, the plate being releasable and repositionable on said cover, the attaching means comprising a releasable and reattachable adhesive layer for adhering to the front cover in a selected position;
   said plate bearing indicia demarking said plate and capable of demarking at least a portion of said dial, thereby indicating a speed warning while still permitting unobstructed viewing of said speedometer dial when said plate is secured on said cover.

2. The improved indicator of claim 1 wherein said indicia comprises coloring for said plate.

3. The improved indicator of claim 1 wherein said plate is configured and dimensioned so as to overlie only a portion of said cover and speedometer dial when affixed to said cover.

4. An improved speedometer, said speedometer comprising a casing having a transparent front cover and a speedometer dial disposed within said casing, spaced behind and viewable through said cover, said speedometer also including a novel speed warning indicator comprising a transparent plate of clear plastic having means for attaching said plate over said cover, the plate being releasable and repositionable on said cover, the attaching means comprising a releasable and reattachable adhesive layer for adhering to the front cover in a selected position, said plate bearing indicia demarking said plate and at least a portion of said speedometer dial, thereby indicating a speed warning while still permitting unobstructed viewing of all of said dial.

5. The improved speedometer of claim 4 wherein said indicia comprises coloring for said plate.

6. The improved speedometer of claim 4 wherein said plate is configured and dimensioned so that it overlies only a portion of said cover and said speedometer dial.

* * * * *